United States Patent [19]

Anderson et al.

[11] 3,966,028

[45] June 29, 1976

[54] AUTOMATIC BRAKE ADJUSTING MECHANISM

[75] Inventors: Bruce D. Anderson, Berkley; Alton B. Holmes, Troy, both of Mich.

[73] Assignee: Rockwell International Corporation, Pittsburgh, Pa.

[22] Filed: Mar. 7, 1975

[21] Appl. No.: 556,486

[52] U.S. Cl............................. 188/196 BA; 188/71.9
[51] Int. Cl.² ........................................ F16D 65/56
[58] Field of Search...... 188/71.9, 79.5 GE, 196 BA

[56] References Cited
UNITED STATES PATENTS 3,227,247   1/1966   Sherretts et al. ............. 188/79.5 GE
3,547,229   12/1970  Pollinger et al. ............. 188/196 BA

*Primary Examiner*—Duane A. Reger

[57] ABSTRACT

A brake assembly including a brake actuating and automatic slack adjusting plunger assembly slidably mounted in a brake support. The plunger assembly includes means independent of the system reaction force, such as a spring, for biasing an adjusting nut to the brake released position and an axially movable rotary driving connection between the adjusting nut and a rod to permit the system reaction force to move the rod relative to the adjusting nut as the brake is released.

7 Claims, 3 Drawing Figures

AUTOMATIC BRAKE ADJUSTING MECHANISM

BACKGROUND OF THE INVENTION

The present invention is directed to an automatic slack adjusting mechanism for a vehicle brake system. More specifically, the invention is directed to a slidable brake actuator plunger assembly responsive to movement beyond a predetermined distance to automatically adjust for slack in the system upon brake releasing movement of the plunger assembly independently of system reaction force released through the plunger assembly.

The invention is particularly useful in combination with an automatic brake adjusting mechanism of the type disclosed in U.S. Pat. No. 3,068,964 issued to W. J. Williams et al on Dec. 18, 1962. That mechanism is comprised of an adjusting rod threadably received internally of an adjustng nut having a helical toothed external surface portion. The adjusting nut and rod are carried internally of a sleeve slidably adjusting nut and rod are carried internally of a sleeve slidably mounted in a spider housing. One end of the rod is non-rotatably engaged with the end of a brake shoe. A wedge actuator of the type disclosed in U.S. Pat. No. 3,037,548 issued to F. T. Cox et al on June 5, 1962 engages the other end of the plunger assembly to move the plunger assembly axially in the spider housing and the brake shoes and lining into frictional contact with a brake drum. Detent means comprising a spring biased pawl having buttress teeth threadedly engaging the helical toothed surface portion of the adjusting nut are also carried by the spider housing.

In that mechanism, when the running clearance increases due to lining wear, the additional axial movement required for the lining to contact the drum causes the pawl to skip a helical tooth on the adjusting nut. Then, when the brake is released, the spring biased return movement of the brake shoes and a reaction force produced by energy stored in the system are transmitted through the rod and the adjusting nut causing the helical teeth on the adjusting nut and the nut to rotate about the buttress teeth provided to the pawl. Rotary movement of the nut relative to the rod moves the rod axially outward of the assembly thereby increasing the overall length of the plunger assembly and returning the brake shoes and lining to the position which provides the desired running clearance between the lining and the drum.

Although the foregoing adjusting mechanism has proven successful in use with wedge actuated drum type brake systems, the automatic adjusting mechanism is subjected to the system reaction force upon release of the brake and the minimum axial length of automatic adjustment is limited by the size and the helix angle of the teeth which must be provided to the pawl and adjusting nut to withstand that force. These problems have become more significant with the advent of disc type brake systems which employ a U-shaped caliper supporting the pad or lining carrying brake shoes on opposite sides of a rotor. In such systems the legs of the caliper expand outwardly as the brake is applied. This distortion produces a substantial reaction force which is transmitted back through the actuating and adjusting mechanism when the brakes are released and may shear the teeth engaged between the pawl and adjusting nut of the previously described automatic adjusting mechanism.

The pressure required between the pads and rotor in a disc brake system is also greater than that required between the brake shoe linings and drum in the conventional drum system. In a wedge actuated disc brake system the additional pressure can be developed by decreasing the wedge angle of the wedge actuator. This increases the mechanical advantage between the wedge actuator and the plunger assembly, but it also reduces the wedge induced axial movement of the plunger assembly and requires a finer increment of automatic adjustment to maintain the desired running clearance between the brake shoe pads and the rotor.

The plunger assembly of the present invention avoids the foregoing problems by providing means independent of the system reaction force for biasing an adjusting nut to the brake released position and axially movable rotary driving means between the adjusting nut and the rod to permit the system reaction force to move the rod relative to the adjusting nut as the brake is released.

SUMMARY OF THE INVENTION

The present invention provides a plunger assembly for an automatic brake adjusting mechanism which includes an adjusting rod, a brake shoe contacting plunger at one end of the rod, means for axially moving the plunger relative to the rod in response to rotary movement of the rod, and an adjusting member having a rotary driving connection with the rod. The plunger assembly is slidably mounted to a brake assembly support, the adjusting member is adapted for axial movement with the rod in a brake applying direction and free for axial movement relative to the rod during return movement of the rod. The plunger assembly also includes energy storing means biasing the adjusting member in the direction of return movement of the rod and means mounted to the support for rotating the adjusting member and the rod during return movement of the member.

It is therefore an object of the present invention to provide an improved plunger assembly for an automatic brake adjusting mechanism in which automatic adjustment is effected independently of the system reaction force.

Another object is to provide an improved plunger assembly for an automatic slack adjusting mechanism in which a finer increment of automatic adjustment may be effected because the mechanism operates independently of the system reaction force.

A further object is to provide an improved plunger assembly for an automatic slack adjusting mechanism for wedge actuated drum type brake systems.

A still further object is to provide an improved plunger assembly for an automatic slack adjusting mechanism for wedged actuated disc type brake systems.

Other objects and advantages of the present invention will become apparent from the following description of the embodiment shown in the accompanying drawings.

DESCRIPTION OF THE DRAWINGS

In the drawings wherein like reference numerals refer to like parts.

DESCRIPTION OF THE INVENTION

Figure 1:
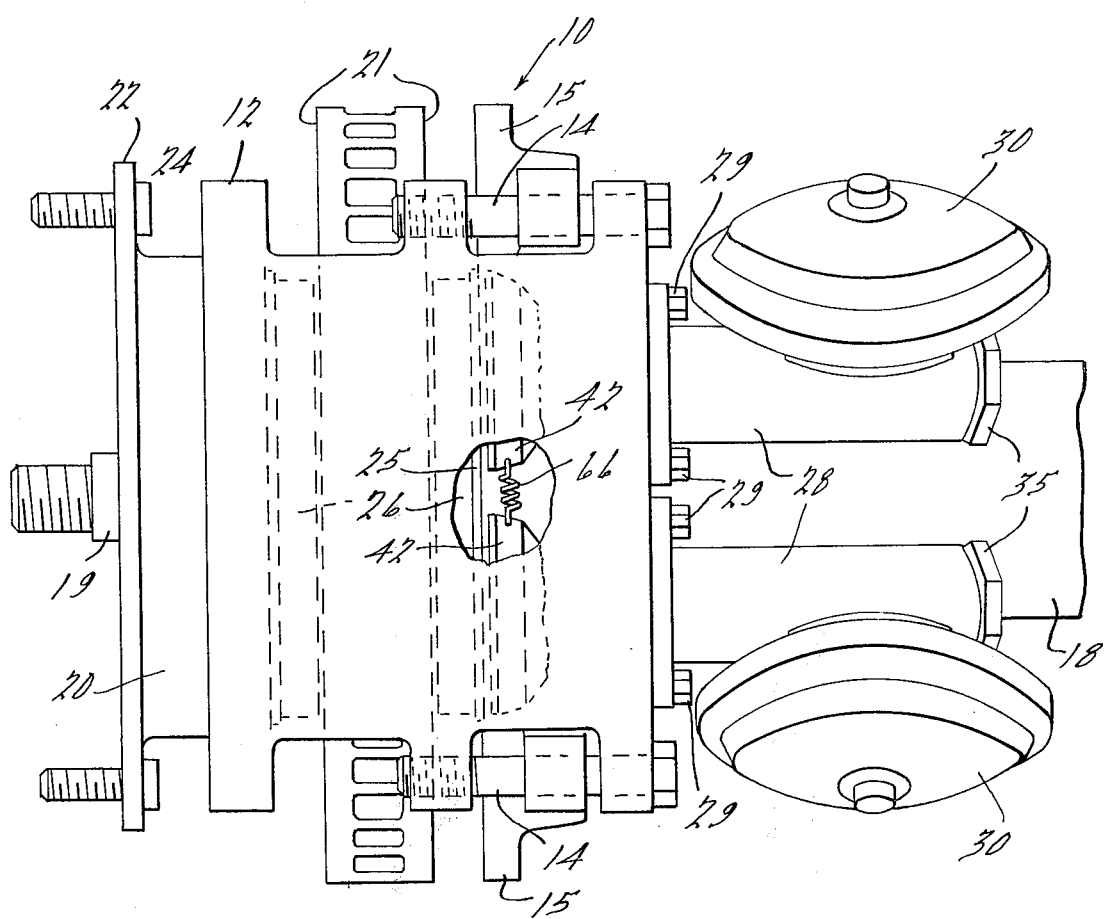
FIG. 1 is a plan view of a disc brake system.
Figure 2:
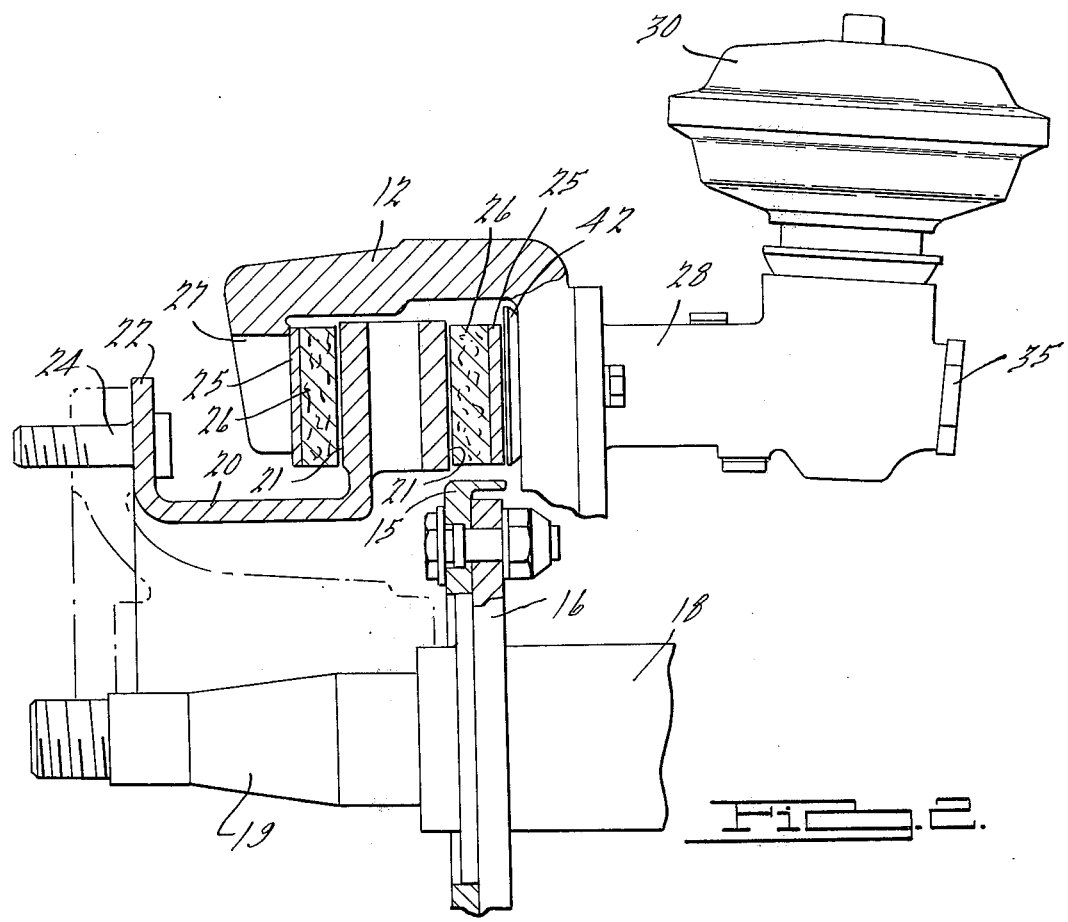
FIG. 2 is a side elevation, partly in section, of the disc brake system of FIG. 1.

With reference to the drawings, FIGS. 1 and 2 show a disc brake assembly generally designated by the numeral 10. The assembly 10 includes a floating caliper 12 slidably mounted by the shanks of bolts 14 to a support member or spider 15. The spider 15 is secured by a plurality of bolts to a flange 16 welded to a vehicle axle 18. A wheel hub, shown by phantom lines in FIG. 2, is rotatably mounted to a spindle 19 provided at the outer end of axle 18. A rotor 20 having axially spaced friction braking annular surfaces 21 may be secured for rotation with the wheel hub by means of a flange 22 and studs 24.

A pair of brake shoes 25 carrying asbestos brake linings or pads 26 are supported by the caliper 12 with the oppositely facing surfaces of the pads 26 and the friction braking surfaces 21 of the rotor 20 in close proximity. The brake shoes 25 are mounted in conventional manner with the inboard shoe free for axially outward movement into engagement with the rotor surface 21 and the outboard shoe mounted for axially inward movement with the depending leg 27 of caliper 12.

A pair of flanged actuator housings 28 are secured by bolts 29 to the axially inboard surface of the caliper 12. The actuator housings 28 each support an actuator motor 30 and a wedge actuator and floating roller assembly 31 of the type disclosed in the aforementioned U.S. Pat. No. 3,037,584. One of the rollers 34 provides a bearing contact between the wedge actuator 32 and a plug 35 fitted to the actuator housing 28. The other roller 34 provides a force transmitting driving connection between the wedge actuator 32 and an adjacent surface 39 of a plunger assembly 40.

The plunger assembly 40 is comprised of an adjusting rod 41 threaded at one end to a brake shoe plunger 42. The brake shoe plunger 42 is slidably received in a bushing 44 threaded to the actuator housing 28. A hollow adjusting nut 45 is axially slidably mounted to the rod 41 adjacent the other end thereof. The nut 45 has a toothed radially extending flange 46 at one end and an axially extending slot 48 opening from the opposite end thereof. A plurality of helical teeth 47 are provided to an exterior surface portion of the adjusting nut 45. A pin 49 press fitted to the rod 41 extends into the slot 48. The pin 49 is axially movable with the rod 41 relative to the adjusting nut 45. The pin 49 also provides a rotary driving connection between the adjusting nut 45 and the rod 41.

The adjusting nut 45 and rod 41 are slidably received within a cylinder or sleeve 50 closed at one end by the surface 39. The sleeve 50 is slidably mounted in the bore of housing 28.

Figure 3:
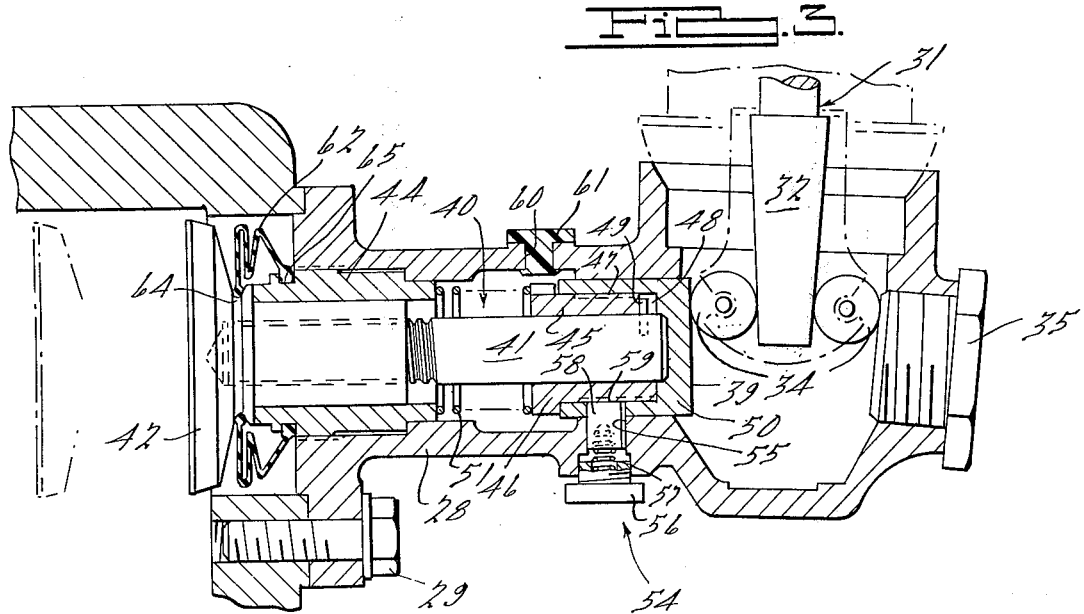
FIG. 3 is an enlarged sectional view showing details of the present invention as incorporated in the brake system of FIGS. 1 and 2.

The plunger assembly 40 is therefore axially slidable at the one end in bushing 44 and at the other end in the bore of housing 28 in response to the outwardly directed force of the roller 34 engaging surface 39 during downward movement of the wedge actuator 32 as viewed in FIG. 3.

The plunger assembly 40 also includes a helical spring 51 and detent means carried by the housing 28 and generally designated by the numeral 54.

The helical spring 51 is seated against the interior end of plunger bushing 44 and against the flange 46 of adjusting nut 45 to bias the adjusting nut axially inward into abutment with the sleeve 50, and provide antirotational friction on the adjusting nut to prevent rotation of the adjusting nut on the application of air pressure to motor 30.

The detent means 54 is provided in a bore 55 which radially intersects the main bore of actuator housing 28.

A pawl 58 having buttress teeth 59 formed on the radially inward facing surface thereof is slidably mounted in the bore 55. The outer end of the bore 55 is threaded to receive a hollow cap screw 56. A spring 57 seated against the hollow interior of cap screw 56 biases the pawl 58 and the buttress teeth 59 inwardly into toothed engagement with the helical teeth 47 provided to the exterior surface of the adjusting nut 45. The detent means 54 and the helical toothed surface 47 of the adjusting nut may be the same as that disclosed in the aforementioned U.S. Pat. No. 3,068,964.

A bore 60 is provided to actuator housing 28 opposite the radially extending toothed flange 46 of adjusting nut 45. The bore 60 is closed by a readily removable elastic plug 61.

A flexible bellows type expanding seal 62 is snugly fitted at its opposite ends to circumferentially extending grooves 64 and 65 respectively provided to the brake shoe plunger 42 and the bushing 44. The seal 62 prevents dirt and other deleterious materials from entering the interior of the actuator housing 28.

The disc brake assembly 10 is normally operated by depression of the vehicle brake pedal which supplies fluid pressure, usually air, to the actuator motor 30. The fluid pressure operating on a piston or diaphragm in the motor 30 moves the wedge actuator and floating roller assembly 31 downward into the actuator housing 28. The roller 34 bearing on the surface 39 moves the plunger assembly 40 axially outward toward the friction braking rotor surfaces 21. This is the direction of brake applying movement of the plunger assembly 40. The brake shoe plunger 42 contacts the brake shoe 25 on the inboard side of the rotor 20 and moves the pad 26 of that brake shoe into frictional contact with the inboard frictional braking surface 21 of the rotor.

Initial contact with the inboard braking surface of the rotor 20 moves the floating caliper 12 to the right as viewed in FIGS. 1 and 2 until the pad 26 of the outboard brake shoe 25 is moved into frictional contact with the outboard frictional braking surface 21 of the rotor. When both pads 26 are in frictional contact with the frictional braking surfaces 21 of the rotor, the depending leg 27 of the caliper is pivoted axially outward under the load applied to the system by the plunger assembly 40.

When the brake pedal is released, fluid pressure is exhausted from the actuator motor 30 and the wedge actuator and floating roller assembly 31 is retracted, usually by spring means within the motor 30 to the position shown in FIG. 3. As soon as the full braking force is released from the rotor 20, the energy causing outward movement of the caliper leg 27 is released and the caliper 12 returns to its unstressed shape. The energy stored in the caliper is instantaneously released through the plunger assembly as a system reaction force. The reaction force instantly moves the brake shoe plunger 42, adjusting rod 41 and the sleeve 50 axially inwardly or to the right as shown in FIG. 3. This is the direction of brake releasing or return movement of the plunger assembly 40.

Although the rod 41 and plunger 42 move instantaneously in response to the system reaction force, the rod 41 and pin 49 are axially inwardly movable relative to the adjusting nut 45 and slot 48. The rod 41 may therefore move forward of the adjusting nut 45 and the adjusting nut will not be subject to the system reaction force. The adjusting nut 45 is returned to the position shown in FIG. 3 by the spring 51 independently of the system reaction force.

Biasing the adjusting nut 45 to the brake released position independently of the system reaction force is an important aspect of the present invention and offers certain advantages which have not heretofore been available.

Automatic adjustment is effected after the pads 26 experience sufficient wear to permit the plunger assembly to move axially a distance greater than the axial length of one of the helical teeth 47 provided to the adjusting nut 45 during brake applying movement of the plunger assembly 40. Under such a condition, the pawl 58 compresses the spring 57 and the buttress teeth 59 skip to an adjacent set of helical teeth 47. When the brake is released, the teeth 59 rotate the adjusting nut 45 and rod 41 during spring biased return movement of the adjusting nut. The brake shoe plunger 42 is fixed against rotary movement, see for example the spring 66 linking the adjacent brake shoe plungers 42 as shown in phantom in FIG. 1. Since the plunger 42 cannot rotate, rotation of the adjusting rod 41 moves the plunger 42 axially outward to extend the effective length of the plunger assembly 40 and take up slack resulting from brake pad wear occurring on both pads.

This adjustment is automatically effected during spring biased return movement of the adjusting nut independently of the system reaction force. The toothed engagement of pawl 58 and adjusting nut 45 is not subject to the system reaction force and therefore the buttress teeth 59 and helical teeth 47 will not be sheared or damaged by the system reaction force. The present invention therefore provides a brake actuator and plunger assembly including an automatic slack adjusting mechanism in which the adjusting mechanism is not subject to damage from the substantial system reaction force developed in a disc brake system.

The invention also provides a brake actuator and automatic slack adjusting mechanism capable of providing finer increments of adjustment since the helical teeth provided to the adjusting nut are not subject to the system reaction force and the minimum axial length of adjustment is not limited by the minimal tooth size which will withstand such a force without damage.

The invention may also be embodied in other specific forms without departing from the spirit or essential characteristics thereof. The foregoing description is therefore to be considered as illustrative and not restrictive, the scope of the invention being defined by the appended claims and all changes which come within the meaning and range of equivalency of the claims and therefore intended to be embraced thereby.

What is claimed and desired to be secured by Letters Patent is:

1. A vehicle brake assembly including a support, a movable brake shoe carried by said support, a movable brake actuator and a plunger assembly slidably mounted to said support and operatively connected to transmit motion from said actuator to said brake shoe, said plunger assembly comprising:

a rod mounted for rotary movement,
a brake shoe contacting plunger at one end of said rod,
means for moving said plunger relative to said rod to extend said plunger assembly in response to rotary movement of said rod,
a member having a rotary driving connection with said rod, said member being mounted for axial movement with said rod during movement of said rod in a brake applying direction and axially movable relative to said rod during return movement of said rod,
compressible energy storing means biasing said member in the direction of said return movement independantly of said rod, and
means for rotating said member and said rod upon said biased return movement of said member.

2. The vehicle brake assembly defined by claim 1 wherein said rod is threadedly engaged with said plunger and said plunger is restrained against rotary movement.

3. The vehicle brake assembly defined by claim 1 wherein said member is slidably received about the exterior surface of said rod.

4. The vehicle brake assembly defined by claim 3 wherein said energy storage means is a spring seated against said support.

5. The vehicle brake assembly defined by claim 3 wherein said rotary driving connection is a pin fixed in said member or said rod for movement in an axially extending slot provided to the other of said member or said rod.

6. The vehicle brake assembly defined by claim 3 wherein helical teeth are provided to an exterior surface portion of said member, said means for rotating said member is a pawl slidably mounted to said support and having teeth engaging their helical teeth and said pawl is biased into toothed engagement with said member.

7. A vehicle brake assembly including a support, a movable brake shoe carried by said support, a movable actuator and a plunger assembly slidably mounted to said support, said plunger assembly comprising:

a rod,
a brake shoe plunger threadably engaged with said rod at one end thereof,
a sleeve slidably mounted to said support and mounting the other end of said rod to said support, said sleeve operatively connecting said actuator to said plunger assembly and said plunger operatively engaging said brake shoe,
an adjusting nut having a rotary driving connecting with said rod, said nut including a portion abutting said sleeve and movable with said sleeve during brake applying movement thereof,
means permitting axial movement of said rod relative to said nut during return movement of said rod,
a spring having one end fixed relative to said support and the other end biasing said nut in the direction of said return movement, and
means carried by said support and operative after predetermined brake applying movement of said plunger assembly to rotate said nut and extend said plunger assembly upon said spring biased return movement of said adjusting nut.

* * * * *

UNITED STATES PATENT OFFICE
CERTIFICATE OF CORRECTION

PATENT NO. : 3,966,028
DATED : June 29, 1976
INVENTOR(S) : Alton B. Holmes & Bruce D. Anderson It is certified that error appears in the above-identified patent and that said Letters Patent are hereby corrected as shown below:

Column 1, Line 21, after "slidably" delete 'adjusting nut and';

Line 22, delete 'rod are carried internally of a sleeve slidably';

Column 6, Claim 6, Line 5, after "engaging" delete 'their' and insert --said--.

Signed and Sealed this

Twelfth Day of April 1977

[SEAL]

Attest:

RUTH C. MASON
*Attesting Officer*

C. MARSHALL DANN
*Commissioner of Patents and Trademarks*